(12) United States Patent
Ikeda

(10) Patent No.: US 9,130,813 B2
(45) Date of Patent: Sep. 8, 2015

(54) RADIO DEVICE, RADIO COMMUNICATION SYSTEM, AND RADIO CONTROL METHOD

(71) Applicant: FUJITSU LIMITED, Kawasaki-shi, Kanagawa (JP)

(72) Inventor: Katsuhiro Ikeda, Yokosuka (JP)

(73) Assignee: FUJITSU LIMITED, Kawasaki (JP)

(*) Notice: Subject to any disclaimer, the term of this patent is extended or adjusted under 35 U.S.C. 154(b) by 293 days.

(21) Appl. No.: 13/690,619

(22) Filed: Nov. 30, 2012

(65) Prior Publication Data

US 2013/0188595 A1 Jul. 25, 2013

(30) Foreign Application Priority Data

Jan. 24, 2012 (JP) .................................. 2012-012196

(51) Int. Cl.
*H04W 4/00* (2009.01)
*H04L 27/26* (2006.01)
(Continued)

(52) U.S. Cl.
CPC ........ *H04L 27/2636* (2013.01); *H04L 25/0226* (2013.01); *H04L 27/2613* (2013.01); *H04W 72/04* (2013.01)

(58) Field of Classification Search
CPC ............. H04W 72/04; H04W 72/0413; H04L 5/0048; H04L 5/005; H04L 25/0226; H04L 25/0228; H04L 25/0224; H04L 25/0232; H04L 25/023; H04L 27/2636; H04L 27/2613
USPC .......... 370/203, 208, 252, 328, 329, 330, 210
See application file for complete search history.

(56) References Cited

U.S. PATENT DOCUMENTS 8,811,305 B2 * 8/2014 Li et al. .......................... 370/329
2012/0327801 A1 * 12/2012 Seo et al. ....................... 370/252
(Continued)

FOREIGN PATENT DOCUMENTS

CN 102067474 A 5/2011
JP 2011-040841 A 2/2011

OTHER PUBLICATIONS

CNOA dated Feb. 28, 2015 for corresponding Chinese Application No. 201210585172.0. Baidu Library, http://wenku.baidu.com/view/8d1321f8700abb68a982fb13.html,3-5 The basic properties of Fourier transform.
(Continued)

*Primary Examiner* — Kwang B Yao
*Assistant Examiner* — Harun Chowdhury
(74) *Attorney, Agent, or Firm* — Maschoff Brennan

(57) ABSTRACT

A radio device including: a processor configured to execute a procedure including a difference calculating process which calculates, when a plurality of transmission symbols are one symbol with different assignment positions of one of a frequency area and a time area, a difference between an assignment position of one reference symbol and an assignment position of another symbol among the plurality of transmission symbols, and a shift process which generates a symbol by shift processing of one of the frequency area and the time area with respect to the reference symbol, which is assigned to the an assignment position and subjected to an orthogonal transform processing, according to the difference; and a transmitter configured to performs transmitting processing based on the reference symbol which is subjected to the orthogonal transform processing and the generated symbol by the shift processing.

6 Claims, 9 Drawing Sheets

(51) Int. Cl.
*H04W 72/04* (2009.01)
*H04L 25/02* (2006.01)

(56) References Cited

U.S. PATENT DOCUMENTS

2013/0107840 A1   5/2013  Ro et al.
2014/0211740 A1*  7/2014  Berggren ..................... 370/329

OTHER PUBLICATIONS

Office Action of Chinese Patent Application No. 201210585172.0. dated Feb. 28, 2015 with whole Translation.

* cited by examiner

RADIO DEVICE, RADIO COMMUNICATION SYSTEM, AND RADIO CONTROL METHOD

CROSS-REFERENCE TO RELATED APPLICATIONS

This application is based upon and claims the benefit of priority of the prior Japanese Patent Application No. 2012-012196, filed on Jan. 24, 2012, the entire contents of which are incorporated herein by reference.

FIELD

The embodiments discussed herein are related to a radio device, and a radio communication system, a radio control method.

BACKGROUND

In recent years, Evolved Universal Terrestrial Radio Access (E-UTRA) has been standardized by Third Generation Partnership Project (3GPP) as a communication specification for a radio device such as a mobile phone. For the E-UTRA, Single Carrier Frequency Division Multiple Access (SC-FDMA) method is supposed to be performed as a specification of a MODEM transmitting unit. This specification is specified in TS36.211 in the 3GPP documents.

For the SC-FDMA method, there are three types of physical channel to be transmitted. One is Physical Uplink Shared Channel (PUSCH), one is Physical Uplink Control Channel (PUCCH), and the other one is Physical Random Access Channel (PRACH). For the SC-FDMA method, there are two types of physical signal to be transmitted. One is Demodulation Reference Signal (DRS), and the other one is Sounding Reference Signal (SRS). For example, the SRS is used to check the quality of a transmission signal and to check how much the transmission signal is deteriorated on a propagation path between a radio device and a base station.

The radio device generates, for example, a Zadoff-Chu sequence to transmit the SRS, maps the generated Zadoff-Chu sequence in a frequency area, and converts the mapped frequency area into a signal of a time area by Inverse Fast Fourier Transform (IFFT) processing. The radio device copies the end of the signal subjected to the IFFT processing as a specified CyclicPrefix (CP) for the number of samples and then inserts the CP into the head of the signal subjected to the IFFT processing. Further, the radio device performs shift processing of ½ sub carrier frequency (for example, equivalent to 7.5 KHz) by multiplying the signal of the time area, which is subjected to the CP processing, by a twiddle factor, and generates the SRS by removing a high frequency of the signal subjected to the shift processing.

Japanese Laid-open Patent Publication No. 2011-40841 is an example of related art.

SUMMARY

According to an aspect of the invention, a radio device includes a processor configured to execute a procedure including a difference calculating process which calculates, when a plurality of transmission symbols are one symbol with different assignment positions of one of a frequency area and a time area, a difference between an assignment position of one reference symbol and an assignment position of another symbol among the plurality of transmission symbols, and a shift process which generates a symbol by shift processing of one of the frequency area and the time area with respect to the reference symbol, which is assigned to the an assignment position and subjected to an orthogonal transform processing, according to the difference, and the radio device includes a transmitter configured to performs transmitting processing based on the reference symbol which is subjected to the orthogonal transform processing and the generated symbol by the shift processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
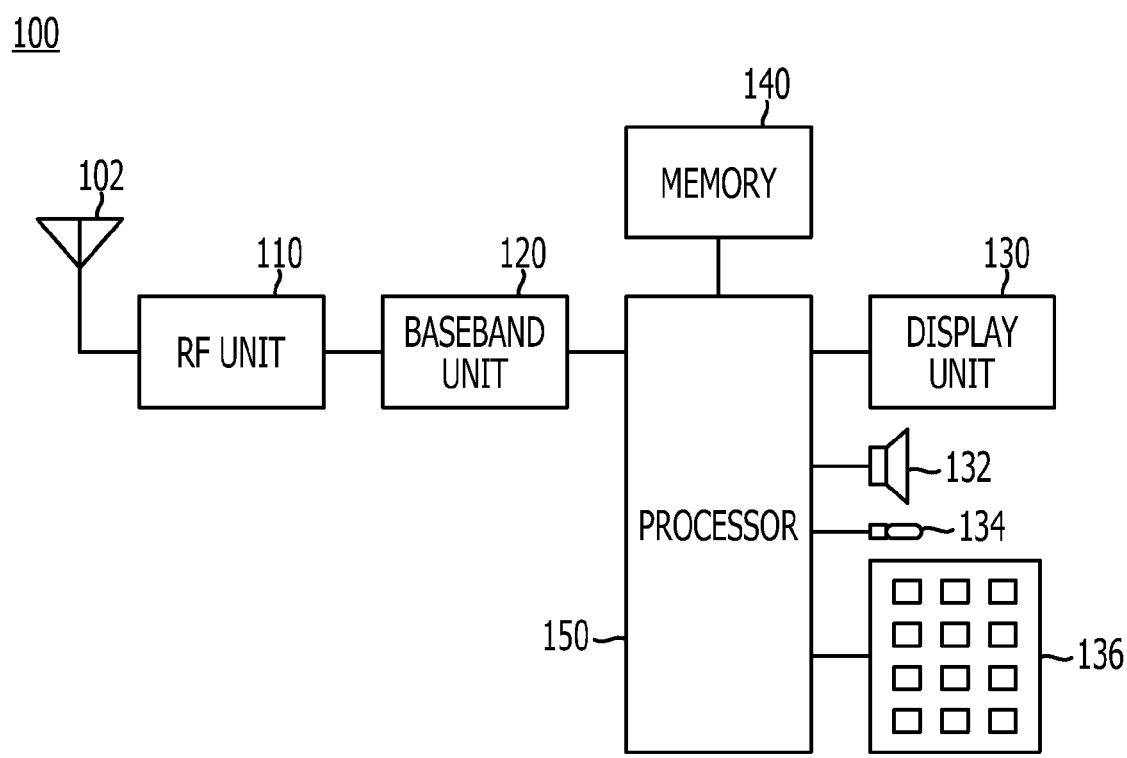
FIG. 1 is a diagram illustrating a hardware structure of a mobile phone.

With reference to the diagrams, embodiments of a radio device, a radio communication system, and a radio control method will be described below. The disclosed technique is not limited to the embodiments. For example, according to the embodiments described below, a mobile phone is described as an example of the radio device. However, the embodiments are not limited to the example. The embodiments may apply to other radio devices such as a smart phone and a Personal Digital Assistant (PDA) with radio communication functions.

While inventing the present embodiments, observations were made regarding a related art. Such observations include the following, for example.

For the E-UTRA, technique of the related art does not disclose reduction of computational amount regarding the transmitting processing in a case where several similar symbols are transmitted to different frequency areas or time areas.

For example, one of Frame Structure Type 1 and Frame Structure Type 2 is used in the E-UTRA specification. Here, as for the frame structure of Frame Structure Type 2, two symbols of SRS may be transmitted in an Uplink Pilot Time Slot (UpPTS) area of a Special Subframe.

In this case, although the two symbols of SRS to be transmitted are assigned to different frequency areas or time areas, the two symbols of SRS are transmitted by using substantially the same Zadoff-Chu sequence. According to the technique of related art, the IFFT processing is performed on each of the two symbols of SRS, so that the computational amount tends to increase.

The problem of the increase in computational amount may occur not simply when the two symbols of SRS are transmitted, but also when several similar symbols are assigned to and transmitted to different frequency areas or time areas.

The disclosed embodiments are intended to solve the above-described problem. An aspect of the disclosed embodiments are to achieve a radio device, a radio control method, and a radio control program that may reduce the computational amount regarding the transmitting processing when the several similar symbols are assigned to and transmitted to different frequency areas or time areas.

[First Embodiment]

The RF unit 110 performs radio communication of various types of data such as voice and text through the antenna 102. The baseband unit 120 converts a signal received by the RF unit 110 into a baseband signal and also converts the converted signal into a digital signal by an Analog/Digital (A/D) converter. Further, the baseband unit 120 performs various types of processing such as demodulating processing and error correcting processing on the converted digital signal. The baseband unit 120 includes, for example, a Central Processing Unit (CPU), a Digital Signal Processor (DSP), or the like. The baseband unit 120 will be described in detail below.

The display unit 130 is an output interface that displays various types of information such as text and image. The speaker 132 is an output interface that outputs voices generated by the processor 150. The microphone 134 is an input interface that inputs voices of an external unit. The keypad 136 is an input interface such as operation keys of the mobile phone 100, for example, that accepts an input of operation by a user.

The memory 140 includes a Read Only Memory (ROM) that stores data used to execute various functions of the mobile phone 100 and various programs used to execute various functions of the mobile phone 100. The memory 140 includes a Random Access Memory (RAM) that stores programs to be executed among the various programs stored in the ROM.

The processor 150 is a calculating processing unit such as a CPU that executes the various programs stored in the memory 140. By executing the various programs stored in the memory 140, the processor 150 controls the RF unit 110, the baseband unit 120, the display unit 130, the speaker 132, the microphone 134, the keypad 136, and the like. The programs to be executed by the processor 150 are stored not simply in the memory 140 but also in a storage medium such as a CD-ROM and a memory medium that may be distributed and may be executed by being read out from the storage medium. A server coupled through a network stores the programs, and the programs operate on the server. Therefore, according to a request from the mobile phone 100 coupled through the network, a service may be given to the mobile phone 100 at the request source.

Figure 2:
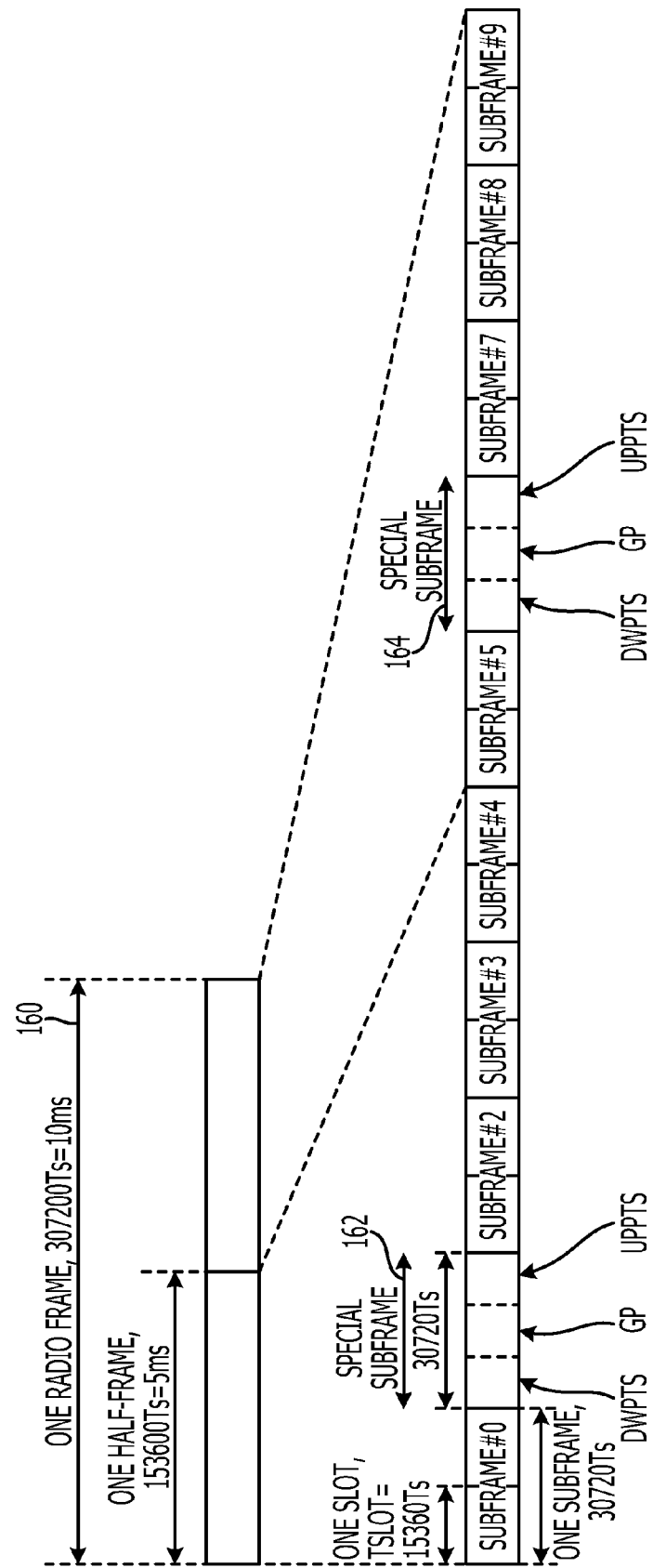
FIG. 2 is a diagram illustrating a frame structure of a Frame Structure Type 2.
Figure 3:
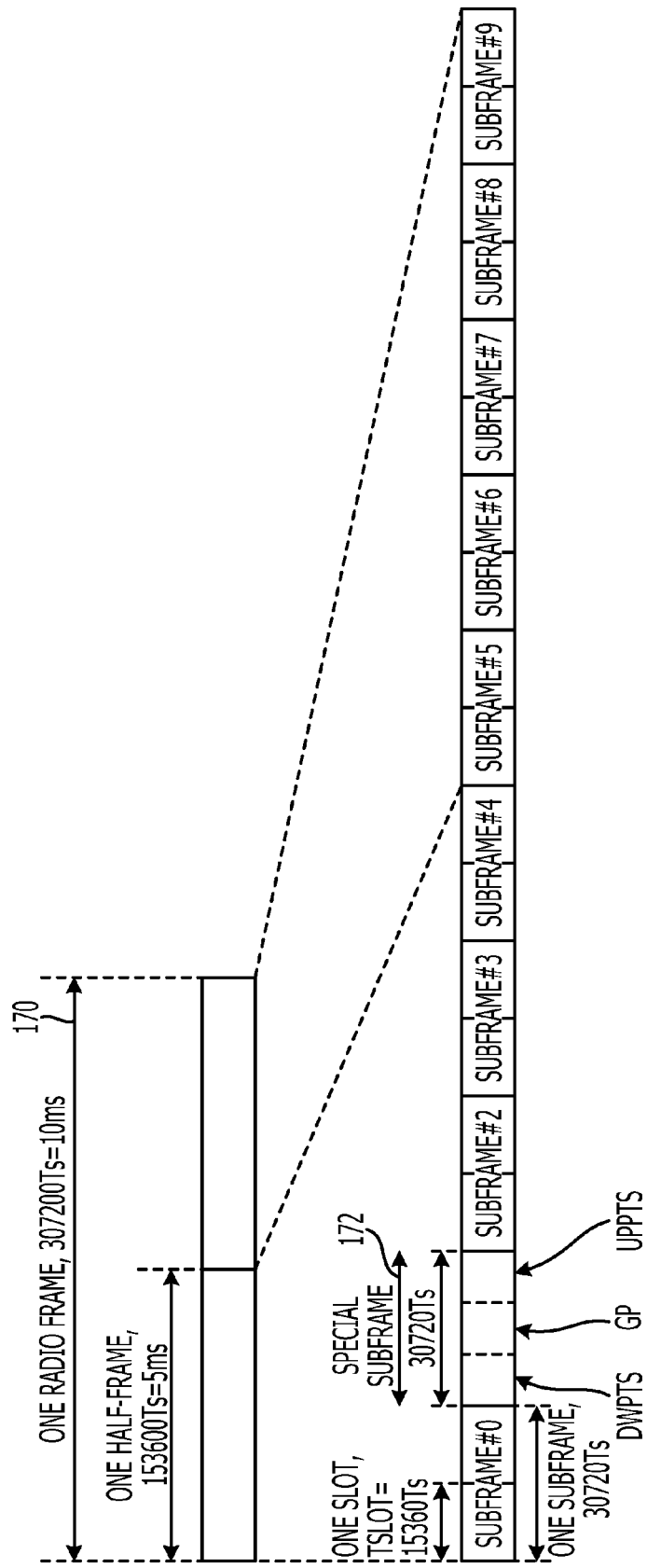
FIG. 3 is a diagram illustrating a frame structure of a Frame Structure Type 3.

The frame structure used for the E-UTRA will be described below. For the E-UTRA, one of Frame Structure Type 1 and Frame Structure Type 2 is used. The first embodiment is applied to Frame Structure Type 2. FIG. 2 is a diagram illustrating an example of the frame structure of Frame Structure Type 2. FIG. 2 illustrates the frame structure (for one radio frame) with 5 ms switch-point periodicity of Frame Structure Type 2. FIG. 3 is a diagram illustrating another example of the frame structure of Frame Structure Type 2. FIG. 3 illustrates the frame structure (for one radio frame) with 10 ms switch-point periodicity of Frame Structure Type 2.

As illustrated in FIG. 2, a frame structure 60 with the 5 ms switch-point periodicity includes ten subframes: subframe #0 to subframe #9. Among the ten subframes, subframe #1 becomes a Special Subframe 162, and subframe #6 becomes a Special Subframe 164. Therefore, the frame structure 160 with the 5 ms switch-point periodicity includes the Special Subframes 162 and 164.

As illustrated in FIG. 3, a frame structure 170 with the 10 ms switch-point periodicity includes ten subframes: subframe #0 to subframe #9. Among the ten subframes, subframe #1 becomes a Special Subframe 172. The frame structure 170 with the 10 ms switch-point periodicity includes a single Special Subframe 172.

Figure 4:
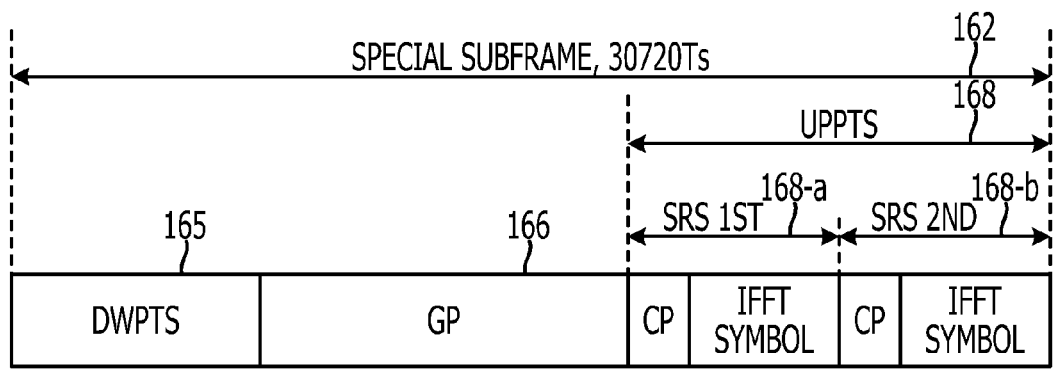
FIG. 4 is a diagram illustrating an example of the frame structure of a Special Subframe.

The frame structure of the Special Subframe will be described below. FIG. 4 is a diagram illustrating an example of the frame structure of the Special Subframe. Here, the Special Subframe 162 is given as an example. The frame structure of the Special Subframe 164 is similar to the frame structure of the Special Subframe 172.

As illustrated in FIG. 4, the Special Subframe 162 includes a Downlink Pilot TimeSlot (DwPTS) 165 and an Uplink Pilot TimeSlot (UpPTS) 168 that are separated by a Guard Period (GP) 166. The DwPTS 165 is an area reserved for transmission to a downlink to the mobile phone 100 from a base station. The UpPTS 168 is an area reserved for transmission to an uplink from the mobile phone 100.

As illustrated in FIG. 4, the UpPTS 168 includes an SRS 1st 168-a (a first SRS) and an SRS 2nd 168-b (a second SRS). In this manner, the first embodiment is applied to a case where the Special Subframe 162 includes two symbols of SRS and the two symbols of SRS are transmitted. In TS36.211 and TS36.213 of the 3GPP documents, the SRS transmission of one symbol or two symbols using the UpPTS is specified.

Figure 5:
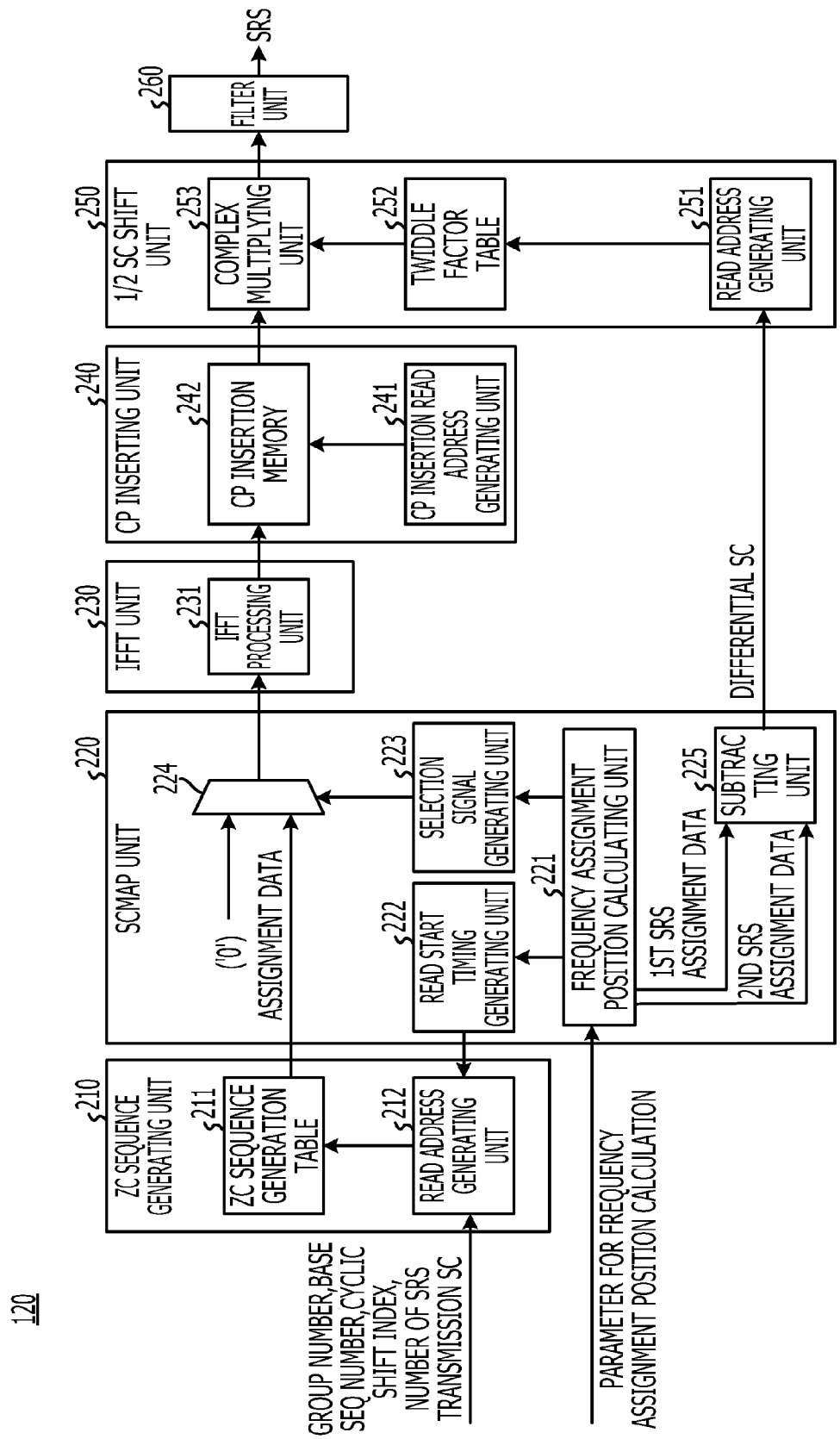
FIG. 5 is a diagram illustrating a structure of a baseband unit according to a first embodiment.

The baseband unit according to the first embodiment in a case where the two symbols of are transmitted will be described below. FIG. 5 is a diagram illustrating a structure of a baseband unit according to the first embodiment. FIG. 5 is a diagram illustrating a structure for transmission of SRS of the baseband unit 120.

As illustrated in FIG. 5, the baseband unit 120 includes a ZC sequence generating unit 210, an SCMAP unit 220, an IFFT unit 230, a CP inserting unit 240, a ½ SC shift unit 250, and a filter unit 260.

The ZC sequence generating unit 210 generates a Zadoff-Chu sequence used to transmit the SRS. Here, the Zadoff-Chu sequence transmitted by the SRS is determined by u (a group number), v (a base sequence number), $n_{SRS}^{CS}$ (a Cyclic Shift amount of SRS), and $M_{sc}^{RS}$ (the number of sub carriers of SRS). Here, hopping operation is specified for u and v. Although the value varies in 1 slot period, the value does not vary for each symbol. Here, $n_{SRS}^{CS}$ is a value that is set from a higher layer for each User Equipment (UE), and the value does not vary for each symbol. Here, $M_{sc}^{RS}$, which is a value that is determined by a transmission bandwidth of the SRS, does not vary for each symbol. Therefore, when the two symbols of SRS are transmitted by the UpPTS, the Zadoff-Chu sequences of the two symbols in the UpPTS are similar to each other. Since the frequency areas to which the two symbols are assigned are different from each other, the value varies in the SCMAP unit 220 and the following units.

The first embodiment reduces a computational amount for calculating the SRS transmission signal of the second symbol. According to the first embodiment, the SCMAP unit 220 calculates a difference between a frequency assignment start position of the first symbol and the frequency assignment start position of the second symbol. The calculated differential sub carrier amount is reported to the ½ SC shift unit 250. The ½ SC shift unit 250 performs sub carrier shift processing of the amount of (½ sub carrier+differential sub carrier) in the processing of the second symbol. Each block of the baseband unit 120 will be described below.

The ZC sequence generating unit 210 includes a ZC sequence generation table 211 and a read address generating unit 212. The ZC sequence generation table 211 is, for example, a memory such as a ROM, a RAM, or the like. As four parameters of Zadoff-Chu sequence generation, "group number," "base seq number," "cyclic shift index," and "the number of SRS transmission sc" are input into the read address generating unit 212. The read address generating unit 212 determines a read address of the ZC sequence generation table 211 based on the input four parameters and then reads out the data of the read address from the ZC sequence generation table 211. The read address generating unit 212 outputs the Zadoff-Chu sequence according to the four parameters to the SCMAP unit 220. The ZC sequence generating unit 210 generates the Zadoff-Chu sequence for the first SRS symbol and does not generate the Zadoff-Chu sequence for the second SRS symbol.

The SCMAP unit 220 is a processing unit that maps transmission signals in the frequency area in which the transmission is performed. The SCMAP unit 220 includes a frequency assignment position calculating unit 221, a read start timing generating unit 222, a selection signal generating unit 223, a selector 224, and a subtracting unit 225.

A parameter for frequency assignment position calculation is input into the frequency assignment position calculating unit 221. The parameter for frequency assignment position calculation indicates an assignment position of the SRS symbol. The frequency assignment position calculating unit 221 calculates an assignment position (the 1st SRS assignment position) of the first SRS based on the input parameter for frequency assignment position calculation and then outputs the calculation result to the read start timing generating unit 222 and the selection signal generating unit 223. Based on the input parameter for frequency assignment position calculation, the frequency assignment position calculating unit 221 outputs the assignment position (the 1st SRS assignment position) of the first SRS symbol and the assignment position (the 2nd SRS assignment position) of the second SRS symbol to the subtracting unit 225.

Base on the assignment position of the first SRS symbol output from the frequency assignment position calculating unit 221, the read start timing generating unit 222 generates a read start timing at which reading out the data from the ZC sequence generation table 211 is started. The read start timing generating unit 222 outputs the generated read start timing to the read address generating unit 212. Based on the read start timing output from the read start timing generating unit 222, the read address generating unit 212 reads out the data of the read address in the ZC sequence generation table 211 and then outputs the data to the SCMAP unit 220.

Based on the assignment position of the first SRS symbol output from the frequency assignment position calculating unit 221, the selection signal generating unit 223 generates and outputs a selection signal to the selector 224. For example, within a frequency assignment range, the selection signal generating unit 223 selects the data read out from the ZC sequence generation table 211 in the assignment position of the first STS symbol and generates a selection signal that selects "0" in the position other than the assignment position of the first SRS symbol.

Based on the selection signal output from the selection signal generating unit 223, the selector 224 selects and outputs "0" or the data read out from the ZC sequence generation table 211 to the IFFT unit 230. For example, within the frequency assignment range, the selector 224 selects the data read out from the ZC sequence generation table 211 in the assignment position of the first SRS symbol and selects "0" in the position other than the assignment position of the first SRS symbol.

The 1st SRS assignment position and the 2nd SRS assignment position output from the frequency assignment position calculating unit 221 are input into the subtracting unit 225. The subtracting unit 225 calculates a differential Sub Carrier (SC) between the 1st SRS assignment position and the 2nd SRS assignment position output from the frequency assignment position calculating unit 221 and then outputs the calculated differential SC to the ½ SC shift unit 250.

Figure 6:
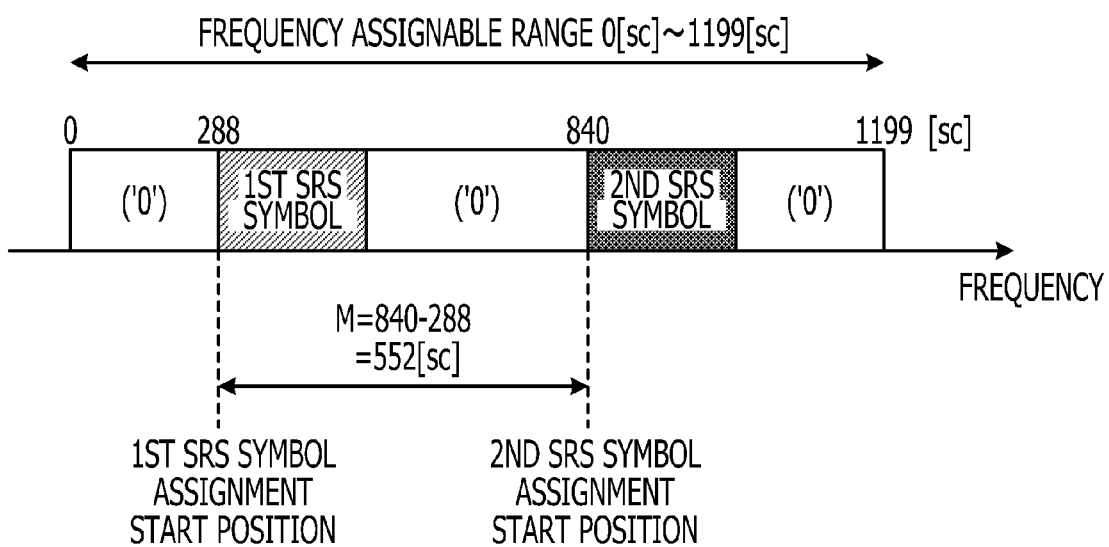
FIG. 6 is a diagram illustrating an example of a differential sub carrier amount.

The differential sub carrier will be described below. FIG. 6 is a diagram illustrating an example of a differential sub carrier amount. As illustrated in FIG. 6, the frequency assignable range starts from 0 (sc) to 1199 (sc). In the example illustrated in FIG. 6, the frequency assignment start position of the 1st SRS symbol indicates 288 (sc), and the frequency assignment start position of the 2nd SRS symbol indicates 840 (sc). In this case, the subtracting unit 225 calculates 840−288=552 (sc) as the differential SC between the 1st SRS assignment position and the 2nd SRS assignment position.

As illustrated in FIG. 5, the IFFT unit 230 includes an IFFT processing unit 231. The data output from the selector 224 is input into the IFFT processing unit 231. By performing inverse Fourier transform processing with respect to the first SRS symbol output from the selector 224, the IFFT processing unit 231 converts the signal that is assigned to the frequency area into a signal in the time area. The IFFT processing unit 231 outputs the signal that is converted into the signal in the time area to the CP inserting unit 240.

The CP inserting unit 240 is a processing unit that copies the end of the signal subjected to the IFFT processing as a specified CyclicPrefix (CP) and then inserts the CP into the head of the signal subjected to the IFFT processing. The CP inserting unit 240 includes a CP insertion read address generating unit 241 and a CP insertion memory 242.

The CP insertion memory 242 is a memory such as a RAM, for example. The signal subjected to the IFFT processing is stored in the CP insertion memory 242. The CP insertion read address generating unit 241 generates a read address for specified samples of the end of the first SRS symbol subjected to the IFFT processing. For example, the CP insertion read address generating unit 241 generates a CP by reading out a CP length of the end of the signal, which is subjected to the IFFT processing, stored in the CP insertion memory 242. The CP insertion read address generating unit 241 sequentially reads out the signal subjected to the IFFT processing from the head thereof and then generates a symbol format of CP+IFFT. The data subjected to the CP inserting processing is read out from the CP insertion memory 242 and is then output to the ½ SC shift unit 250.

The ½ SC shift unit 250 is a processing unit that shifts the ½ sub carrier frequency (equivalent to 7.5 KHz) by multiplying the signal in the time area by the twiddle factor. The ½ SC shift unit 250 includes a read address generating unit 251, a twiddle factor table 252, and a complex multiplying unit 253.

The twiddle factor table 252 is a memory such as a ROM or a RAM, for example. As for the first SRS symbol, the read address generating unit 251 generates a read address of a parameter that shifts the data subjected to the CP inserting processing by ½ sub carrier frequency (equivalent to 7.5 KHz). For example, the read address generating unit 251 reads out the data of the generated read address from the twiddle factor table 252 and then outputs the read out parameter to the complex multiplying unit 253.

On the other hand, the differential SC output from the subtracting unit 225 is input into the read address generating unit 251. As for the second SRS symbol, the read address generating unit 251 generates a read address of a parameter that performs the shift of ½ sub carrier frequency (equivalent to 7.5 KHz)+differential SC with respect to the first SRS symbol stored in the CP insertion memory 242. For example, the read address generating unit 251 reads out the data of the generated read address from the twiddle factor table 252 and then outputs the read-out parameter to the complex multiplying unit 253.

As for the first SRS symbol, based on the parameter read out from the twiddle factor table 252, the complex multiplying unit 253 multiplies the signal subjected to the CP insertion by the twiddle factor and then performs shift of ½ sub carrier frequency (equivalent to 7.5 KHz) to output the signal to the filter unit 260. As for the second SRS symbol, based on the parameter read out from the twiddle factor table 252, the complex multiplying unit 253 multiplies the signal that is subjected to the CP insertion by the twiddle factor based on the parameter read out from the twiddle factor table 252 and then performs the shift for ½ sub carrier frequency (equivalent to 7.5 KHz)+differential SC to output the signal to the filter unit 260.

The filter unit 260 is a processing unit that removes a high frequency component of the signal output from the complex multiplying unit 253. The filter unit 260 outputs the signal of which the high frequency component is removed.

Figure 7:
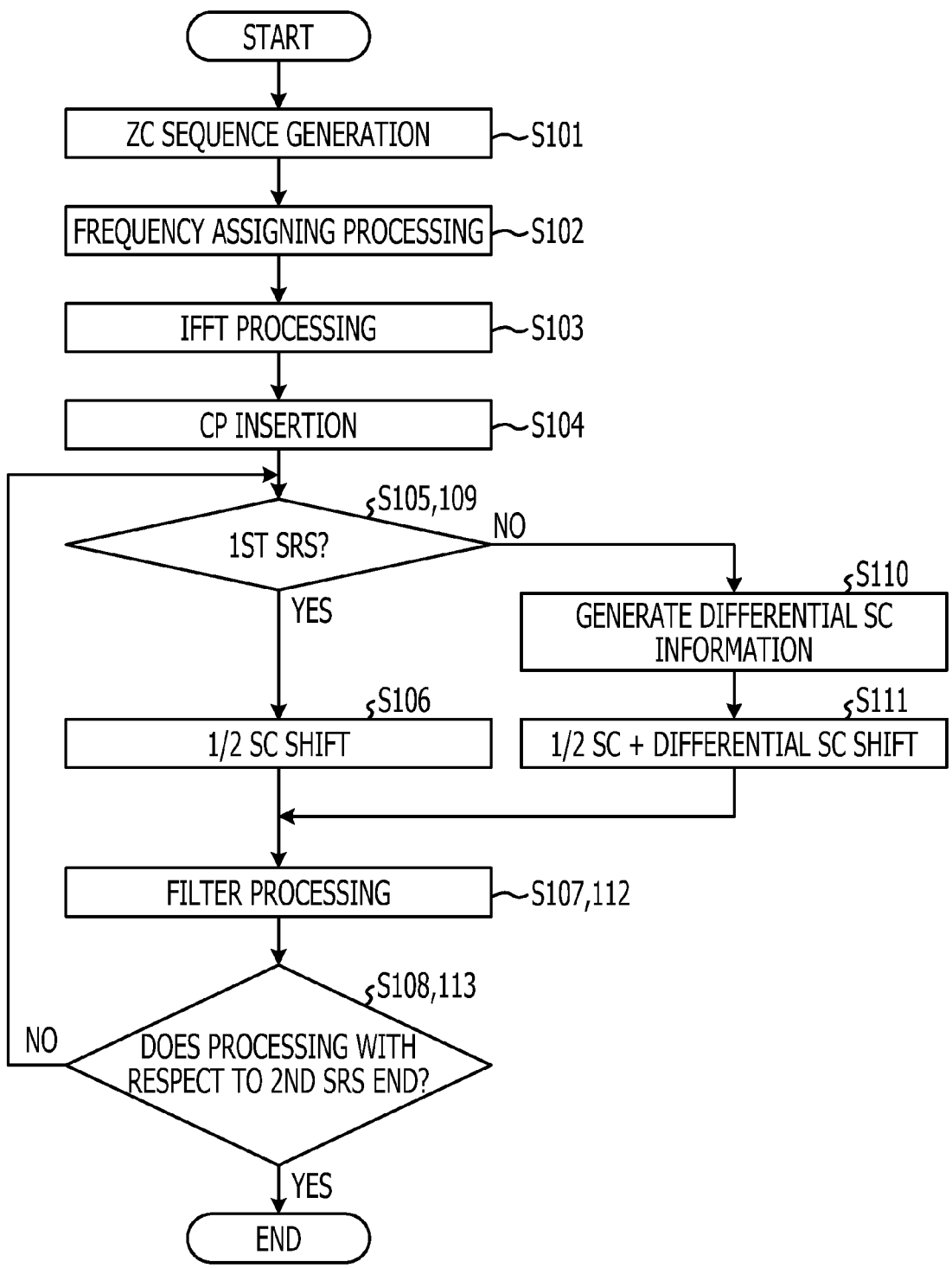
FIG. 7 is a flowchart of processing of the baseband unit according to the first embodiment.

A processing flow of the baseband unit according to the first embodiment will be described below. FIG. 7 is a flowchart of the processing of the baseband unit according to the first embodiment. The baseband unit according to the first embodiment performs processing regarding the 1st SRS and then performs the processing regarding the 2nd SRS.

As illustrated in FIG. 7, the ZC sequence generating unit 210 generates a ZC sequence with respect to the 1st SRS (Operation S101). The SCMAP unit 220 performs assigning processing of the frequency area with respect to the 1st SRS (Operation S102). The IFFT unit 230 performs the IFFT processing with respect to the 1st SRS (Operation S103). The IFFT unit 230 stores the signal subjected to the IFFT processing in the CP insertion memory 242. The CP inserting unit 240 performs the CP inserting processing with respect to the 1st SRS stored in the CP insertion memory 242 (Operation S104).

The ½ SC shift unit 250 determines whether the processing of the 1st SRS is being currently performed (Operation S105). If ½ SC shift unit 250 determines that the processing of the 1st SRS is being currently performed (YES in Operation S105), the ½ SC shift unit 250 performs ½ sub carrier shift processing on the 1st SRS stored in the CP insertion memory 242 (Operation S106).

Here, the ½ sub carrier shift processing will be described below. If the sampling rate is $f_{SR}$, the sub carrier interval is $\Delta f$, the symbol before the sub carrier shift processing is $x(n)$, and the symbol after the sub carrier shift processing is $X(n)$, the ½ sub carrier shift processing is given by Formula 1.

$$X(n) = x(n)\exp\left(j2\pi\frac{\Delta f}{2}\frac{1}{f_{SR}}n\right) = x(n)\exp\left(j\pi\Delta f\frac{1}{f_{SR}}n\right)$$ [Formula 1]

Here, the reference n=0 is the symbol head after the IFFT processing. If $\Delta f$=15 KHz and $f_{SR}$=30.72 MHz specified in the E-UTRA are applied to Formula 1, Formula 2 is obtained.

$$X(n) = x(n)\exp\left(j\pi\frac{1}{2048}n\right)$$ [Formula 2]

The filter unit 260 performs filter processing to remove the high frequency component of the signal that is subjected to the ½ sub carrier shift processing (Operation S107). The filter unit 160 removes the high-frequency component of the signal that is subjected to the ½ sub carrier shift processing and then outputs the signal as the 1st SRS.

The SCMAP unit 220 determines whether the processing with respect to the 2nd SRS ends (Operation S108). Here, since the processing with respect to the 2nd SRS does not end, the SCMAP unit 220 determines that the processing with respect to the 2nd SRS does not end (NO in Operation S108).

The SCMAP unit 220 determines whether the processing of the 1st SRS is being performed (Operation S109). Here, since the processing of the 2nd SRS is being performed, the SCMAP unit 220 determines that the processing of the 1st SRS is not being performed (NO in Operation S109). The SCMAP unit 220 generates differential SC information of the assignment position of the 1st SRS and the assignment position of the 2nd SRS (Operation S110). The ½ SC shift unit 250 performs the shift processing of ½ sub carrier+differential SC on the 1st SRS stored in the CP insertion memory 242 (Operation S111).

The shift processing of ½ sub carrier+differential SC will be described below. If the differential SC amount is M (sc), the shift processing of ½ sub carrier+differential SC is given as Formula 3.

$$X(n) = x(n)\exp\left(j2\pi\Delta f\left(\frac{1}{2} + M\right)\frac{1}{f_{SR}}n\right) = $$

$$x(n)\exp\left(j\pi\Delta f(1+2M)\frac{1}{f_{SR}}n\right)$$ [Formula 3]

If $\Delta f$=15 KHz and $f_{SR}$=30.72 MHz specified in the E-UTRA are applied to Formula 3, the shift processing of ½ sub carrier+differential SC is given as Formula 4.

$$X(n) = x(n)\exp\left(j\pi(1+2M)\frac{1}{2048}n\right)$$ [Formula 4]

The differential SC amount M (sc), which is a difference between the frequency assignment position of the 1st SRS symbol and the frequency assignment position of the 2nd SRS symbol, is obtained by 2nd SRS symbol frequency assignment start position−1st SRS symbol frequency assignment start position. As illustrated in FIG. 6, for example, if the frequency assignment start position of the 1st SRS symbol is 288 (sc) and if the frequency assignment start position of the 2nd SRS symbol is 840 (sc), the subtracting unit 225 calculates differential SC amount M=840−288=552 (sc).

The filter unit 260 performs the filter processing to remove the high-frequency component of the signal that is subjected to the shift processing of ½ sub carrier+differential SC (Operation S112). The filter unit 260 removes the high-frequency component of the signal that is subjected to the shift processing of ½ sub carrier+differential SC and then outputs the signal as the 2nd SRS. The SCMAP unit 220 determines whether the processing with respect to the 2nd SRS ends (Operation S113). Here, since the processing with respect to the 2nd SRS ends, the SCMAP unit 220 determines that the processing with respect to the 2nd SRS ends (YES in Operation S112), and the process ends.

As described above, according to the first embodiment, the computational amount regarding the transmitting processing may be reduced when the two SRS symbols are assigned to and transmitted to different frequency areas. That is, according to the conventional technique, at both a time of generating the 1st SRS symbol and a time of generating the 2nd SRS symbol, the ZC sequence generating processing, the frequency assigning processing, the IFFT processing, the CP inserting processing, the ½ shift processing, and the filter processing are performed.

On the contrary, according to the first embodiment, at the time of generating the 2nd SRS symbol, the ZC sequence generating processing, the frequency assigning processing, the IFFT processing, and the CP inserting processing may be omitted. In other words, according to the first embodiment, the 1st SRS symbol that is subjected to the ZC sequence generating processing, the frequency assignment processing, the IFFT processing, and the CP inserting processing is stored in the CP insertion memory 242, and the stored data is used as the 2nd SRS symbol. More specifically, the first embodiment focuses on the fact that the 1st SRS symbol and the 2nd SRS symbol are in substantially the same Zadoff-Chu sequence and different frequency areas are assigned to the 1st SRS symbol and the 2nd SRS symbol. According to the first embodiment, the shift processing of ½ sub carrier+differential SC is performed on the data stored in the CP insertion memory 242, and the data subjected to the shift processing is used as the 2nd SRS symbol. Accordingly, at the time of generating the 2nd SRS symbol, the ZC sequence generating processing, the frequency assigning processing, the IFFT processing, and the CP inserting processing may be omitted. Especially, regarding the IFFT processing with a large computational amount, the number of butterfly computation indicated in Formula 5 may be reduced if the IFFT size is $N_{IFFT}$ and the IFFT includes butterfly of radix 2.

$$\frac{N_{IFFT}}{2}\log_2 N_{IFFT} \qquad \text{[Formula 5]}$$

Since one of the butterfly computing units includes one complex multiplication, the number of complex multiplication indicated in Formula 6 may be reduced.

$$\frac{N_{IFFT}}{2}\log_2 N_{IFFT} \qquad \text{[Formula 6]}$$

If $N_{IFFT}$=2048, the reduction amount corresponds to 11264 of complex multiplication. Regarding the 2nd SRS transmission according to the first embodiment, the conventional ½ sub carrier shift processing is (½ sub carrier+differential SC) shift processing. However, the twiddle factor to be complex-multiplied varies, and the number of complex multiplication does not increase.

[Second Embodiment]

A mobile phone according to a second embodiment will be described below. The mobile phone according to the second embodiment is different from the mobile phone according to the first embodiment in that the structure of the baseband unit is different. The other structures are equivalent to the first embodiment. Therefore, the baseband unit will be described below, and description of the other structures is omitted. Although the first embodiment describes an example of transmission of two SRS symbols (the 1st SRS symbol and the 2nd SRS symbol) by the SC-FDMA method, the embodiments are not limited to the example. The second embodiment describes an example of a case where various (two) similar symbols are assigned to and transmitted to different frequency areas or time areas.

Figure 8:
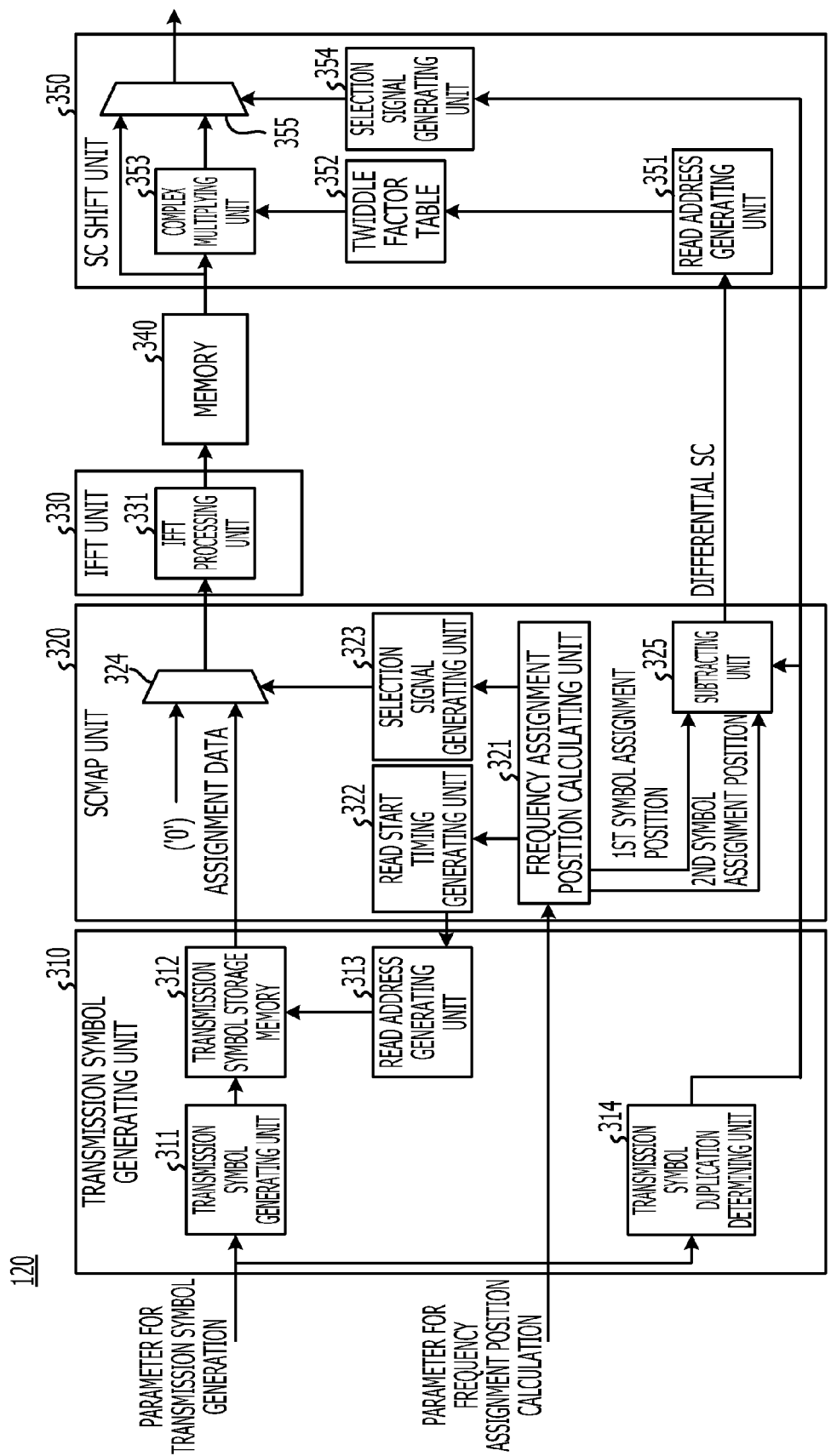
FIG. 8 is a diagram illustrating an example of a structure of a baseband unit according to a second embodiment.

FIG. 8 is a diagram illustrating an example of the structure of the baseband unit according to the second embodiment. As illustrated in FIG. 8, a baseband unit 120 includes a transmission symbol generating unit 310, an SCMAP unit 320, an IFFT unit 330, a memory 340, and an SC shift unit 350.

The transmission symbol generating unit 310 includes a transmission symbol generating unit 311, a transmission symbol storage memory 312, a read address generating unit 313, and a transmission symbol duplication determining unit 314.

A parameter for transmission symbol generation is input into the transmission symbol generating unit 311. The transmission symbol generating unit 311 generates a transmission symbol based on the input parameter and then stores the transmission symbol in the transmission symbol storage memory 312. The transmission symbol storage memory 312 is a memory such as a RAM, for example. The read address generating unit 313 determines the read address of the transmission symbol storage memory 312 and then reads out the data of the read address from the transmission symbol storage memory 312. The data that is read out from the transmission symbol storage memory 312 by the read address generating unit 313 is output to the SCMAP unit 320.

The parameter for transmission symbol generation is input into the transmission symbol duplication determining unit 314. Based on the input parameter for transmission symbol generation, the transmission symbol duplication determining unit 314 determines whether a plurality of transmission symbols is similar symbols with different assignment positions of the frequency area. If it is determined that the plurality of transmission symbols is similar symbols with different assignment positions of the frequency area, the transmission symbol generating unit 311 generates the transmission symbol simply for a first transmission symbol (1st symbol).

The SCMAP unit 320 is a processing unit that maps transmission signals in the frequency area in which the transmission is performed. The SCMAP unit 320 includes a frequency assignment position calculating unit 321, a read start timing generating unit 322, a selection signal generating unit 323, a selector 324, and a subtracting unit 325.

A parameter for frequency assignment position calculation is input into the frequency assignment position calculating unit 321. The parameter for frequency assignment position calculation indicates the assignment position of the transmission symbol. If it is determined that the plurality of transmission symbols is similar to each other, the frequency assignment position calculating unit 321 calculates an assignment position of a first transmission symbol (1st symbol assignment position) based on the input parameter for frequency assignment position calculation. The frequency assignment position calculating unit 321 outputs a calculation result to the read start timing generating unit 322 and the selection signal generating unit 323. On the other hand, if it is determined that the plurality of transmission symbols is not similar to each other, the frequency assignment position calculating unit 321 calculates the assignment position (1st symbol assignment position) of the first transmission symbol and the assignment position (2nd symbol assignment position) of the second transmission symbol (2nd symbol).

Based on the input parameter for frequency assignment position calculation, the frequency assignment position calculating unit 321 outputs the assignment position (1st symbol assignment position) of the first transmission symbol and the assignment position (2nd symbol assignment position) of the second transmission symbol to the subtracting unit 325.

Based on the assignment position of the transmission symbol output from the frequency assignment position calculating unit 321, the read start timing generating unit 322 generates a read start timing at which reading out the data from the transmission symbol storage memory 312 is started. The read start timing generating unit 322 outputs the generated read start timing to the read address generating unit 313. Based on the read start timing output from the read start timing generating unit 322, the read address generating unit 313 reads out the data of the read address stored in the transmission symbol storage memory 312 and then outputs the data to the SCMAP unit 320.

Based on the assignment position of the first transmission symbol output from the frequency assignment position calculating unit 321, the selection signal generating unit 323 generates a selection signal and then outputs the selection signal to the selector 324. For example, the selection signal generating unit 323 selects the data read out from the transmission symbol storage memory 312 in the assignment position of the first transmission symbol and generates a selection signal that selects "0" in the position other than the assignment position of the first transmission symbol.

Based on the selection signal output from the selection signal generating unit 323, the selector 324 selects and outputs "0" or the data read out from the transmission symbol storage memory 312 to the IFFT unit 330. For example, the selector 324 selects the data read out from the transmission symbol storage memory 312 in the assignment position of the first transmission symbol and selects "0" in the position other than the assignment position of the first transmission symbol.

The 1st symbol assignment position and the 2nd symbol assignment position that are output from the frequency assignment position calculating unit 321 are input into the subtracting unit 325. A determination result output from the transmission symbol duplication determining unit 314 is input into the subtracting unit 325. If the input determination result indicates that the plurality of transmission symbols is similar symbols with different assignment positions of the frequency area, the subtracting unit 325 calculates the differential SC between the 1st symbol assignment position and the 2nd symbol assignment position output from the frequency assignment position calculating unit 321. The subtracting unit 325 outputs the calculated differential SC to the SC shift unit 350. On the other hand, if the input determination result indicates that the plurality of transmission symbols is not similar symbols with different assignment positions of the frequency area, the subtracting unit 325 does not perform the processing.

The IFFT unit 330 includes an IFFT processing unit 331. The data output from the selector 324 is input into the IFFT processing unit 331. By performing the inverse Fourier transform processing on the first transmission symbol output from the selector 324, the IFFT processing unit 331 converts the signal that is assigned to the frequency area into a signal in the time area. The IFFT processing unit 331 stores the signal that is converted into the signal in the time area in the memory 340. The memory 340, which is a storage medium such as a RAM, stores the data output from the IFFT processing unit 331.

The SC shift unit 350 is a processing unit that performs the shift of the differential SC by multiplying the signal in the time area by the twiddle factor. The SC shift unit 350 includes a read address generating unit 351, a twiddle factor table 352, a complex multiplying unit 353, a selection signal generating unit 354, and a selector 355.

The twiddle factor table 352 is a memory such as a ROM or a RAM, for example. The differential SC output from the subtracting unit 325 is input into the read address generating unit 351. As for the second SRS symbol, the read address generating unit 351 performs the shift of the differential SC on the first transmission symbol stored in the memory 340. For example, the read address generating unit 351 reads out the data of the generated read address from the twiddle factor table 352 and then outputs the read out parameter to the complex multiplying unit 353.

As for the first transmission symbol, based on the parameter read out from the twiddle factor table 352, the complex multiplying unit 353 performs the shift of the differential SC by multiplying the first transmission symbol stored in the memory 340 by the twiddle factor.

The determination result output from the transmission symbol duplication determining unit 314 is input into the selection signal generating unit 354. Based on the determination result output from the transmission symbol duplication determining unit 314, the selection signal generating unit 354 generates and outputs a selection signal to the selector 355. For example, if the input determination result indicates that the plurality of transmission symbols is similar symbols with different assignment positions of the frequency area, the selection signal generating unit 354 generates a selection signal that selects the data, which is input into the selector 355 without through the complex multiplying unit 353 from the memory 340, in the assignment position of the first transmission symbol. If the input determination result indicates that the plurality of transmission symbols is similar symbols with different assignment positions of the frequency area, the selection signal generating unit 354 generates a selection signal that selects the data, which is input into the selector 355 through the complex multiplying unit 353 from the memory 340, in the assignment position of the second transmission symbol.

If the plurality of transmission symbols is not similar symbols with different assignment positions of the frequency area, the selection signal generating unit 354 generates the selection signal that select the data input as well as the first and second transmission symbols into the selector 355 without through the complex multiplying unit 353 from the memory 340.

Based on the selection signal output from the selection signal generating unit 354, the selector 355 selects the data input into the selector 355 without through the complex multiplying unit 353 from the memory 340 or the data input into the selector 355 through the complex multiplying unit 353 from the memory 340. For example, if the determination result indicates that the plurality of transmission symbols is similar symbols with different assignment positions of the frequency area, the selector 355 selects the data, which is input into the selector 355 without thorough the complex multiplying unit 353 from the memory 340, in the assignment position of the first transmission symbol. If the plurality of transmission symbols is similar symbols with different assignment positions of the frequency area, the selector 355 selects the data, which is input into the selector 355 through the complex multiplying unit 353 from the memory 340, in the assignment position of the second transmission symbol.

Figure 9:
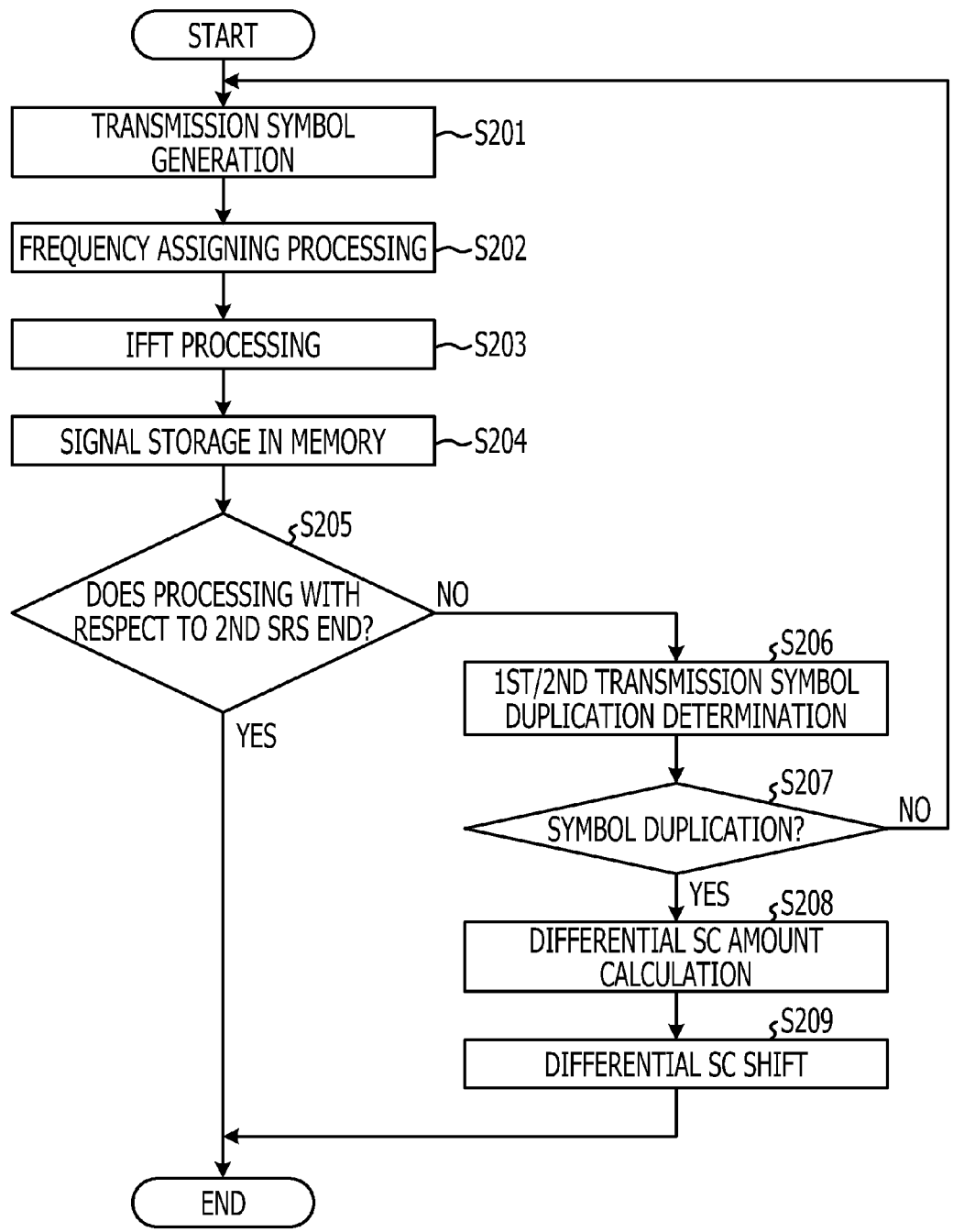
FIG. 9 is a flowchart of processing of the baseband unit according to the second embodiment.

A processing flow of the baseband unit according to the second embodiment will be described below. FIG. 9 is a flowchart of processing of the baseband unit according to the second embodiment. The baseband unit according to the second embodiment performs processing regarding the first transmission symbol and then performs the processing regarding the second transmission symbol.

As illustrated in FIG. 9, the transmission symbol generating unit 310 generates a transmission symbol with respect to the first transmission symbol (Operation S210). The SCMAP unit 320 performs the assigning processing of the frequency area with respect to the first transmission symbol (Operation S202). The IFFT unit 330 performs the IFFT processing with respect to the first transmission symbol (Operation S203). The IFFT unit 330 stores the signal that is subjected to the IFFT processing in the memory 340 (Operation S204).

The transmission symbol duplication determining unit 314 determines whether the processing with respect to the 2nd symbol ends (Operation S205). Here, since the processing with respect to the 2nd symbol does not end, the transmission symbol duplication determining unit 314 determines that the processing with respect to the 2nd symbol does not end (NO in Operation S205).

The transmission symbol duplication determining unit 314 determines whether the 1st symbol overlaps the 2nd symbol (Operation S206). For example, the transmission symbol duplication determining unit 314 determines whether the 1st symbol and the 2nd symbol are similar symbols with different frequency assignment areas.

If it is determined that the 1st symbol does not duplicate the 2nd symbol (NO in Operation S207), the transmission symbol duplication determining unit 314 goes back to Operation S201. In this case, the processing from Operation S201 to Operation S204 is performed with respect to the 2nd symbol. In Operation S205, it is determined that the processing with respect to the 2nd symbol ends (YES in Operation S205), the process ends.

If it is determined that the 1st symbol duplicates the 2nd symbol (YES in Operation S207), the process goes back to Operation S201. Here, differential sub carrier amount M' (sc) is calculated by M'=(2nd symbol frequency assignment start position)−(1st symbol frequency assignment start position).

The SC shift unit 350 performs the shift processing of the differential SC with respect to the 1st symbol stored in the memory 340 (Operation S209). The process ends. Here, if the symbol before the sub carrier shift processing is x' (n), the symbol after the sub carrier shift processing is X' (n), and the differential sub carrier amount is M' (sc), the sub carrier shift processing is indicated as Formula 7.

$$X'(n) = x'(n)\exp\left(j2\pi\Delta fM'\frac{1}{f_{SR}}n\right) \quad \text{[Formula 7]}$$

According to the second embodiment, the computational amount regarding the transmitting processing may be reduced when two transmission symbols are assigned to and transmitted to different frequency areas. That is, according to the conventional technique, at both the time of generating the 1st symbol and the time of generating the 2nd symbol, the transmission symbol generating processing, the frequency assigning processing, and the IFFT processing are performed.

On the contrary, according to the second embodiment, at the time of generating the 2nd symbol, the transmission symbol generating processing, the frequency assigning processing, and the IFFT processing are omitted. In other words, according to the second embodiment, the 1st symbol that is subjected to the transmission symbol generating processing, the frequency assigning processing, and the IFFT processing is stored in the memory 340, and the stored data is used also as the 2nd symbol. More specifically, according to the second embodiment, the transmission symbol duplication determining unit 314 determines whether the 1st symbol and the 2nd symbol are similar symbols with different frequency areas. If it is determined that the 1st symbol and the 2nd symbol are similar to each other, the shift processing of the differential SC is performed on the data stored in the memory 340, and the data subjected to the shift processing is used as the 2nd symbol. As a result, at the time of generating the 2nd symbol, the transmission symbol generating processing, the frequency assigning processing, and the IFFT processing may be omitted. Regarding especially the IFFT processing with a large computational amount, the number of $N_{IFFT}+N_{CP}$ of complex multiplication is added, so that the total reduction amount of complex multiplication is indicated as Formula 8. Here, $N_{CP}$ is a CylicPrefix length. If $N_{IFFT}=2048$ and $N_{CP}=144$, the reduction amount corresponds to 9027 duplex multiplication.

$$\frac{N_{IFFT}}{2}\log_2 N_{IFFT} - (N_{IFFT} + N_{CP}) \quad \text{[Formula 8]}$$

The second embodiment describes the example of transmission of two transmission symbols. However, the embodiments are not limited to the example. For example, the second embodiment may also be applied to a case of transmitting three or more transmission symbols. In this case, the SCMAP unit 320 assigns one reference symbol from among the three or more transmission symbols to the frequency area. The IFFT unit 330 performs the inverse Fourier transform processing to the time area with respect to the reference symbol that is assigned to the frequency area by the SCMAP unit 320. The transmission symbol duplication determining unit 314 determines whether the three or more transmission symbols are similar symbols with different assignment positions of the frequency area.

If the transmission symbol duplication determining unit 314 determines that the three or more symbols are similar symbols with different assignment positions of the frequency area, the subtracting unit 325 calculates the difference between the assignment position of the frequency area of the reference symbol and the assignment position of the frequency area of another symbol. For example, if the reference symbol is the symbol A among the symbols A, B, and C, the subtracting unit 325 calculates the difference between the assignment position of the frequency area of the transmission symbol A and the assignment position of the frequency area of the transmission symbol B and also obtains the assignment position of the frequency area of the transmission symbol C corresponding to the assignment position of the frequency area of the transmission symbol A. With respect to the reference symbol that is subjected to the inverse Fourier transform processing by the IFFT unit 330, the SC shift unit 350 performs the shift processing of the time area according to the difference calculated by the subtracting unit 325. For example, if the reference symbol is the symbol A among the symbols A, B, and C, the SC shift unit 350 performs the shift processing of the time area on the transmission symbol A, which is subjected to the inverse Fourier transform processing, according to the difference between the assignment position of the frequency area of the transmission symbol A and the assignment position of the frequency area of the transmission symbol B. With respect to the transmission symbol A that is subjected to the inverse Fourier transform processing, the SC shift unit 350 performs the shift processing of the time area according to the difference between the assignment position of the frequency area of the transmission symbol A and the assignment position of the frequency area of the transmission symbol C.

For example, if the reference symbol is A among the transmission symbols A, B, and C, the selection signal generating unit 354 generates the selection signal that selects the data, which is input into the selector 355 without through the complex multiplying unit 353 from the memory 340, in the assignment position of the transmission symbol A. The selection signal generating unit 354 generates the selection signal that selects the data, which is input into the selector 355 through the complex multiplying unit 353 from the memory 340, in the assignment position of the transmission symbol B. In the assignment position of the transmission symbol C, the selection signal generating unit 354 generates the selection signal that selects the data, which is input into the selector 355 through the complex multiplying unit 353 from the memory 340, in the assignment position of the transmission symbol C.

The above-described embodiments describe the example of performing the inverse Fourier transform from the frequency area into the time area by the IFFT units 230 and 330. However, the embodiments are not limited to the example. For example, the transmission symbols are assigned to the time area by the SCMAP units 220 and 320, and the Fourier transform from the time area into the frequency area may be performed. In this case, the ½ SC shift unit 250 and the SC shift unit 350 may perform the sub carrier shift processing of the transmission symbol in the frequency area.

The above-described embodiments describe mainly the mobile phone 100 and the radio control method. However, the embodiments are not limited to the mobile phone 100 and the radio control method. By executing a radio control program prepared in advance in a computer (radio device), the functions that are equivalent to the above-described embodiments may be achieved. That is, the radio control program causes the radio device to perform the processing for assigning one reference symbol among the plurality of transmission symbols to the frequency area or the time area. The radio control program causes the radio device to perform orthogonal transform processing between the frequency area and the time area with respect to the reference symbol that is assigned to the frequency area or the time area. The radio control program causes the radio device to perform the processing for determining whether the plurality of transmission symbols is similar symbols with different assignment positions of the frequency area or the time area. If it is determined that the plurality of symbols is similar symbols with different assignment positions of the frequency area or the time area, the radio control program causes the radio device to perform processing for calculating the difference between the assignment position of the frequency area or the time area of the reference symbol and the assignment position of the frequency area or the time area of another symbol. The radio control program causes the radio device to perform the shift processing of the frequency area or the time area according to the calculated difference with respect to the reference symbol that is subject to the orthogonal transform processing. The radio control program causes the radio device to perform the transmitting processing based on the symbol that is subjected to the orthogonal transform processing and on the symbol that is subjected to the shift processing of the frequency area and the time area. The radio control program may be distributed to computers through a communication network such as the Internet. The radio control program may be executed by being recorded in a memory, a hard disk, or a computer readable recording mediums provided in the radio device and being read out from the recording medium by the computer.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A radio device comprising:
a processor configured to execute a procedure including:
an assigning process which assigns a reference symbol among a plurality of transmission symbols to one of a frequency area and a time area, wherein the assigning process assigns one of a first sounding reference signal and a second sounding reference signal included in an UpPTS specified an SC-FDMA method to the frequency area;
an orthogonal transform process which performs an orthogonal transform processing of the frequency area and the time area on the reference symbol, wherein the orthogonal transform process performs inverse Fourier transform processing with respect to the assigned sounding reference signal into the time area;
a determining process which determines whether the plurality of transmission symbols are each in a substantially same transmission sequence with the different assignment positions of one of the frequency area and the time area;
a difference calculating process which calculates, when the plurality of transmission symbols are each in the substantially same transmission sequence with different assignment positions of one of the frequency area and the time area, a difference between an assignment position of the reference symbol and an assignment position of another symbol among the plurality of transmission symbols, wherein the difference calculating process further calculates a difference between the assignment position of the frequency area of the first sounding reference signal and the assignment position of the frequency area of the second sounding reference signal; and
a shift process which generates a symbol by shift processing of one of the frequency area and the time area with respect to the reference symbol according to the difference and in response to the plurality of transmission symbols each being in the substantially same transmission sequence, wherein according to a ½ sub carrier, the shift process generates a first symbol by performing the shift processing of the time area with respect to one of the sounding reference signals subjected to the inverse Fourier transform processing and generates a second symbol by performing the shift processing of the time area on one of the sounding reference signals, subjected to the inverse Fourier transform processing, according to an additional value of the ½ sub carrier and the difference; and
a transmitter configured to transmit the reference symbol which is subjected to the orthogonal transform processing and the symbol generated by the shift processing.

2. The radio device of claim 1, wherein the substantially same transmission sequence includes a substantially same Zadoff-Chu sequence.

3. A radio communication system, comprising:
a radio device configured to:
assign a reference symbol among a plurality of transmission symbols to one of a frequency area and a time area, wherein the assigning process assigns one of a first sounding reference signal and a second sounding reference signal included in an UpPTS specified an SC-FDMA method to the frequency area;
perform an orthogonal transform processing of the frequency area and the time area on the reference symbol, wherein the orthogonal transform process performs inverse Fourier transform processing with respect to the assigned sounding reference signal into the time area;
determine whether the plurality of transmission symbols are each in a substantially same transmission sequence with the different assignment positions of one of the frequency area and the time area;
calculate, when the plurality of transmission symbols are each in the substantially same transmission sequence with different assignment positions of one of the frequency area and the time area, a difference between an assignment position of the reference symbol and an assignment position of another symbol among the plurality of transmission symbols, wherein the difference calculating process further calculates a difference between the assignment position of the frequency area of the first sounding reference signal and the assignment position of the frequency area of the second sounding reference signal;
generate a symbol by shift processing of one of the frequency area and the time area with respect to the reference symbol according to the difference and in response to the plurality of transmission symbols each being in the substantially same transmission sequence, wherein according to a ½ sub carrier, the shift processing generates a first symbol by performing the shift processing of the time area with respect to one of the sounding reference signals subjected to the inverse Fourier transform processing and generates a second symbol by performing the shift processing of the time area on one of the sounding reference signals, subjected to the inverse Fourier transform processing, according to an additional value of the ½ sub carrier and the difference; and
perform transmitting of the reference symbol and the symbol subjected to the shift processing; and
a base station configured to receive a radio signal transmitted by the the radio device.

4. The radio communication system of claim 3, wherein the substantially same transmission sequence includes a substantially same Zadoff-Chu sequence.

5. A radio control method performed by a radio device, the radio control method comprising:
assigning a reference symbol among a plurality of transmission symbols to one of a frequency area and a time area, wherein the assigning process assigns one of a first sounding reference signal and a second sounding reference signal included in an UpPTS specified an SC-FDMA method to the frequency area;
performing an orthogonal transform processing of the frequency area and the time area on the reference symbol, wherein the orthogonal transform process performs inverse Fourier transform processing with respect to the assigned sounding reference signal into the time area;
determining whether the plurality of transmission symbols are each in a substantially same transmission sequence with the different assignment positions of one of the frequency area and the time area;
calculating, when the plurality of transmission symbols are each in the substantially same transmission sequence with different assignment positions of one of the frequency area and the time area, a difference between an assignment position of the reference symbol and an assignment position of another symbol among the plurality of transmission symbols, wherein the difference calculating process further calculates a difference between the assignment position of the frequency area of the first sounding reference signal and the assignment position of the frequency area of the second sounding reference signal;
generating a symbol by shift processing of one of the frequency area and the time area with respect to the reference symbol according to the difference and in response to the plurality of transmission symbols each being in the substantially same transmission sequence, wherein according to a ½ sub carrier, the shift processing generates a first symbol by performing the shift processing of the time area with respect to one of the sounding reference signals subjected to the inverse Fourier transform processing and generates a second symbol by performing the shift processing of the time area on one of the sounding reference signals, subjected to the inverse Fourier transform processing, according to an additional value of the ½ sub carrier and the difference; and
performing transmitting of the reference symbol and the symbol generated by the shift processing.

6. The radio control method of claim 5, wherein the substantially same transmission sequence includes a substantially same Zadoff-Chu sequence.

\* \* \* \* \*